United States Patent
Katou et al.

(10) Patent No.: US 9,855,917 B2
(45) Date of Patent: Jan. 2, 2018

(54) COMMUNICATION APPARATUS, VEHICLE CONTROL DEVICE, AND VEHICLE CONTROL SYSTEM

(71) Applicant: DENSO CORPORATION, Kariya, Aichi-pref. (JP)

(72) Inventors: Kenji Katou, Kariya (JP); Munenori Matsumoto, Nishio (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/116,837

(22) PCT Filed: Jan. 29, 2015

(86) PCT No.: PCT/JP2015/000388
§ 371 (c)(1),
(2) Date: Aug. 5, 2016

(87) PCT Pub. No.: WO2015/118840
PCT Pub. Date: Aug. 13, 2015

(65) Prior Publication Data
US 2017/0144630 A1 May 25, 2017

(30) Foreign Application Priority Data
Feb. 10, 2014 (JP) .................. 2014-023600

(51) Int. Cl.
*B60R 25/24* (2013.01)
*B60R 25/20* (2013.01)
(Continued)

(52) U.S. Cl.
CPC .......... *B60R 25/24* (2013.01); *B60R 25/2018* (2013.01); *B60R 25/23* (2013.01); *G07C 9/00309* (2013.01)

(58) Field of Classification Search
CPC ..... B60R 25/24; B60R 25/2018; B60R 25/23; G07C 9/00309; G07C 5/0858; G07C 9/00857
(Continued)

(56) References Cited

U.S. PATENT DOCUMENTS

2008/0122595 A1* 5/2008 Yamamichi ......... B60R 25/2018
340/426.16
2009/0231094 A1* 9/2009 Higgins ............. G07C 9/00309
340/5.64
(Continued)

FOREIGN PATENT DOCUMENTS

JP H11208419 A 8/1999
JP 2003041825 A 2/2003
(Continued)

*Primary Examiner* — Ali Neyzari
(74) *Attorney, Agent, or Firm* — Harness, Dickey & Pierce, P.L.C.

(57) ABSTRACT

A communication apparatus for communicating with both of a vehicle control device, which performs vehicle control preliminary set in a vehicle when authentication with an authentication device carried by a user is successful, and a portable device, which functions as the authentication device, the communication apparatus also functioning as the authentication device, the communication apparatus includes: a to-portable-device communicator that performs wireless communication with the portable device when performing authentication with the vehicle control device; and an authenticator that performs authentication with the vehicle control device when wireless communication with the portable device is established.

10 Claims, 14 Drawing Sheets

(51) Int. Cl.
*B60R 25/23* (2013.01)
*G07C 9/00* (2006.01)

(58) Field of Classification Search
USPC .............................. 340/5.61, 5.64; 701/22
See application file for complete search history.

(56) References Cited

U.S. PATENT DOCUMENTS

| | | | |
|---|---|---|---|
| 2012/0215391 A1* | 8/2012 | Schaefer | G07C 5/0858 |
| | | | 701/22 |
| 2013/0237189 A1 | 9/2013 | Nishidai | |
| 2015/0120085 A1 | 4/2015 | Sanji et al. | |
| 2016/0063784 A1* | 3/2016 | Murakami | G07C 9/00309 |
| | | | 340/5.61 |

FOREIGN PATENT DOCUMENTS

| | | |
|---|---|---|
| JP | 4433304 B2 | 3/2010 |
| JP | 2012028854 A | 2/2012 |
| JP | 2013159980 A | 8/2013 |
| JP | 2013185376 A | 9/2013 |
| JP | 2013245468 A | 12/2013 |

* cited by examiner

COMMUNICATION APPARATUS, VEHICLE CONTROL DEVICE, AND VEHICLE CONTROL SYSTEM

CROSS REFERENCE TO RELATED APPLICATIONS

This application is a U.S. National Phase Application under 35 U.S.C. 371 of International Application No. PCT/JP2015/000388 filed on Jan. 29, 2015 and published in Japanese as WO 2015/118840 A1 on Aug. 13, 2015. This application is based on and claims the benefit of priority from Japanese Patent Application No. 2014-023600 filed on Feb. 10, 2014. The entire disclosures of all of the above applications are incorporated herein by reference.

TECHNICAL FIELD

The present disclosure relates to a communication apparatus of communicating with a vehicle control device, the vehicle control device, and a vehicle control system.

BACKGROUND ART

There is known a communication apparatus that is capable of communicating with a vehicle control device and used in authentication with the vehicle control device (refer to Patent Literature 1, for example). The communication apparatus performs the authentication by communication with the vehicle control device to thereby function as a key of the vehicle control device. The communication apparatus is configured in such a manner that a function thereof can be restricted by setting, for example, a function of opening the trunk of a vehicle is inhibited.

However, in the above communication apparatus, when another person uses the communication apparatus to control the vehicle on the condition that forwarding of the vehicle is asked to an employee, for example, in a restaurant or a hotel, the vehicle may be stolen by the employee or other people.

PRIOR ART LITERATURES

Patent Literature

Patent Literature 1: JP-4433304-B1

SUMMARY OF INVENTION

It is an object of the present disclosure to enable theft to be reduced when a person other than an owner is allowed to drive a vehicle in a communication apparatus of communicating with a vehicle control device, the vehicle control device, and a vehicle control system.

According to a first aspect of the present disclosure, a communication apparatus for communicating with both of a vehicle control device, which performs vehicle control preliminary set in a vehicle when authentication with an authentication device carried by a user is successful, and a portable device, which functions as the authentication device, the communication apparatus also functioning as the authentication device, the communication apparatus includes: a to-portable-device communicator that performs wireless communication with the portable device when performing authentication with the vehicle control device; and an authenticator that performs authentication with the vehicle control device when wireless communication with the portable device is established.

Such a communication apparatus can be used as a device for performing authentication with the vehicle control device only within a communicable range with the portable device. Thus, when the communication apparatus is carried by a person other than the owner of the vehicle, it is possible to restrict an area in which the vehicle can be controlled.

According to a second aspect of the present disclosure, a vehicle control device that performs vehicle control preliminary set in a vehicle when authentication with an authentication device carried by a user is successful, and communicates with the communication apparatus according to the first aspect as the authentication device.

According to the above vehicle control device, the communication apparatus can be used as a device for performing authentication with the vehicle control device only within a communicable range with the portable device. Thus, when the communication apparatus is carried by a person other than the owner of the vehicle, it is possible to restrict an area in which the vehicle can be controlled.

According to a third aspect of the present disclosure, a vehicle control system includes: a vehicle control device that performs vehicle control preliminary set in a vehicle when authentication with an authentication device carried by a user is successful; a portable device that functions as the authentication device; and a communication apparatus that communicates with both the vehicle control device and the portable device. The communication apparatus is configured as the communication apparatus according to the first aspect; and the vehicle control device is configured as the vehicle control device according to the second aspect.

According to the above system, the communication apparatus can be used as a device for performing authentication with the vehicle control device only within a communicable range with the portable device. Thus, when the communication apparatus is carried by a person other than the owner of the vehicle, it is possible to restrict an area in which the vehicle can be controlled.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1A:
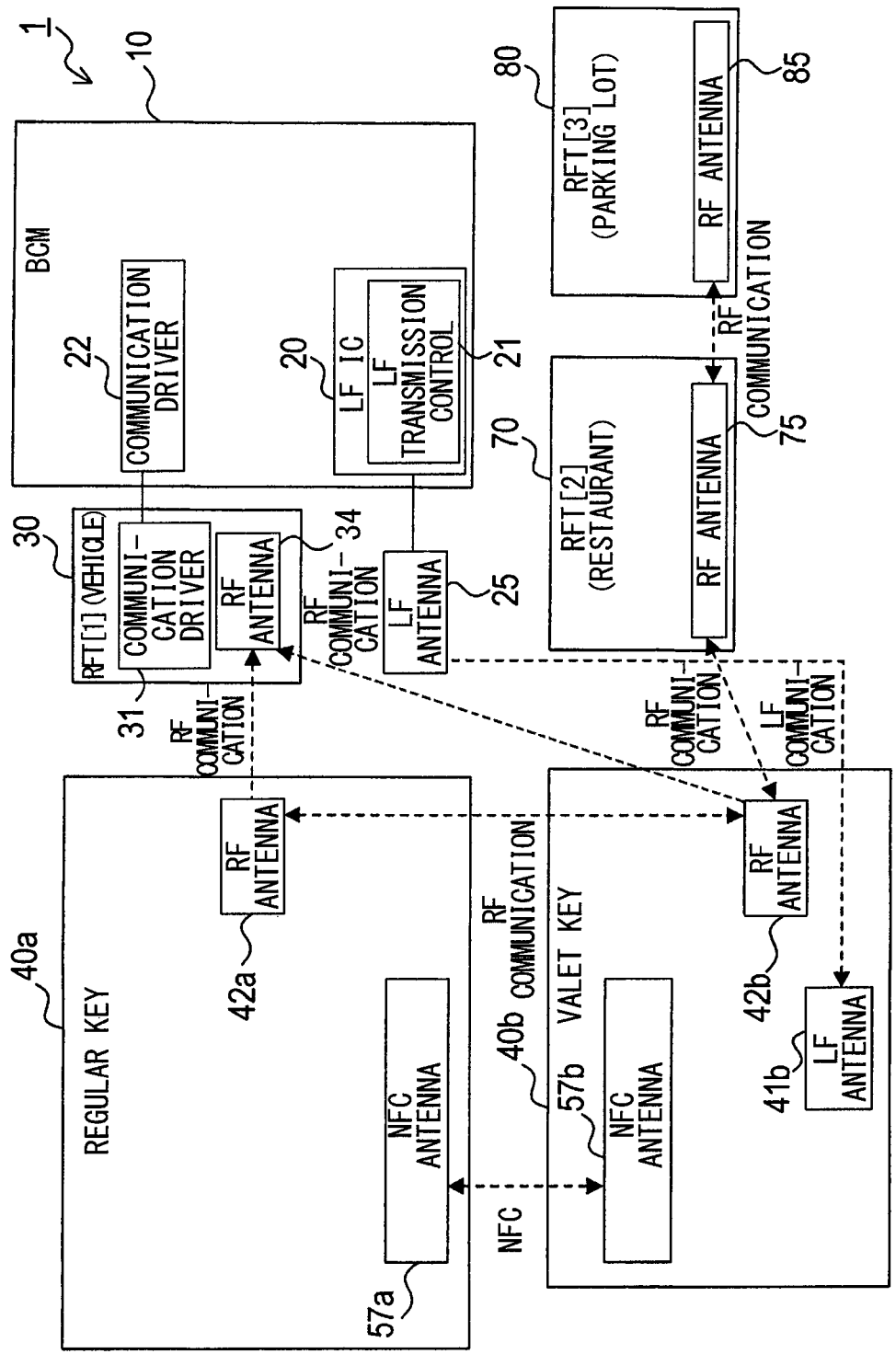
FIG. 1A is a block diagram illustrating a schematic configuration of a vehicle control system to which the present disclosure is applied.
Figure 1B:
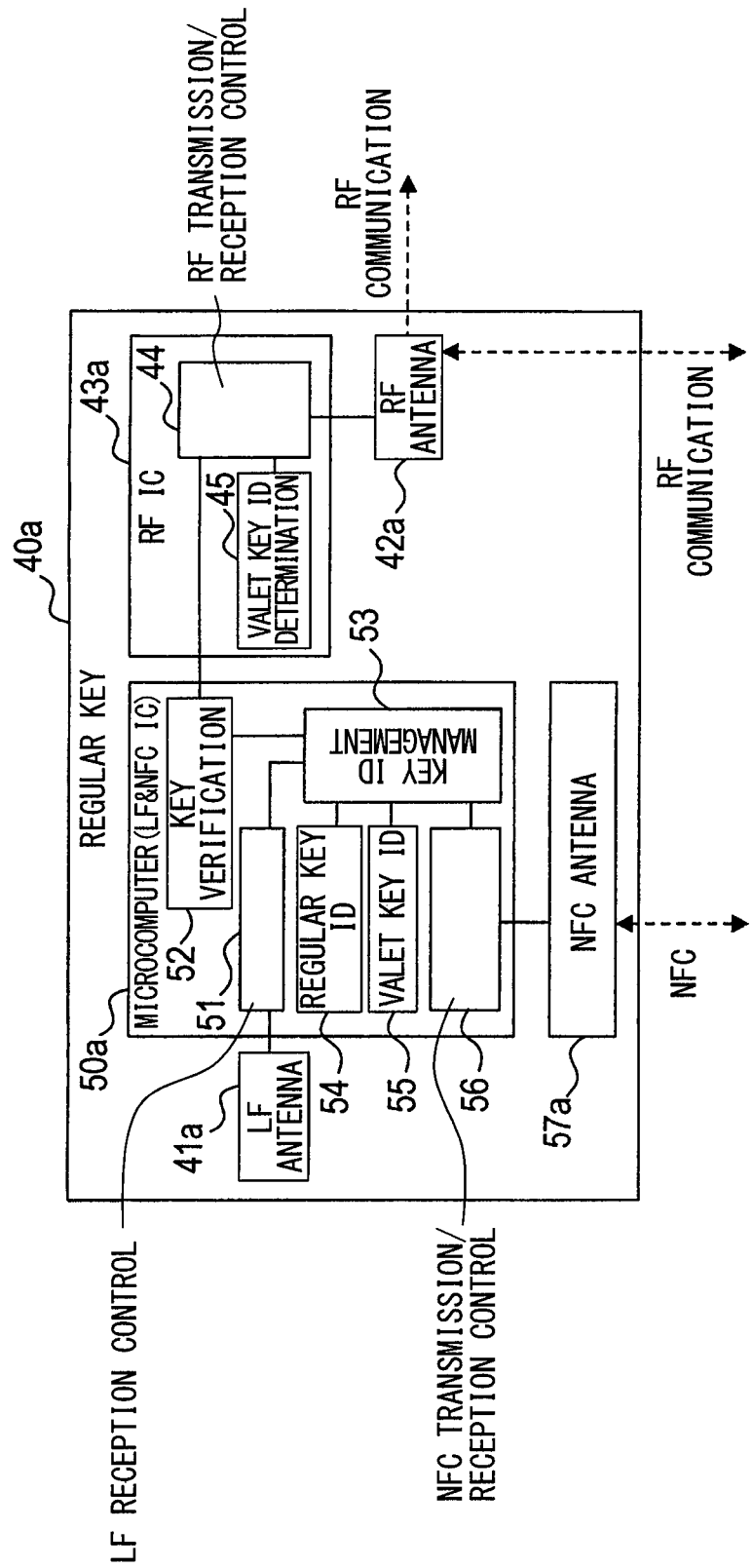
FIG. 1B is a block diagram illustrating a schematic configuration of a regular key.
Figure 1C:
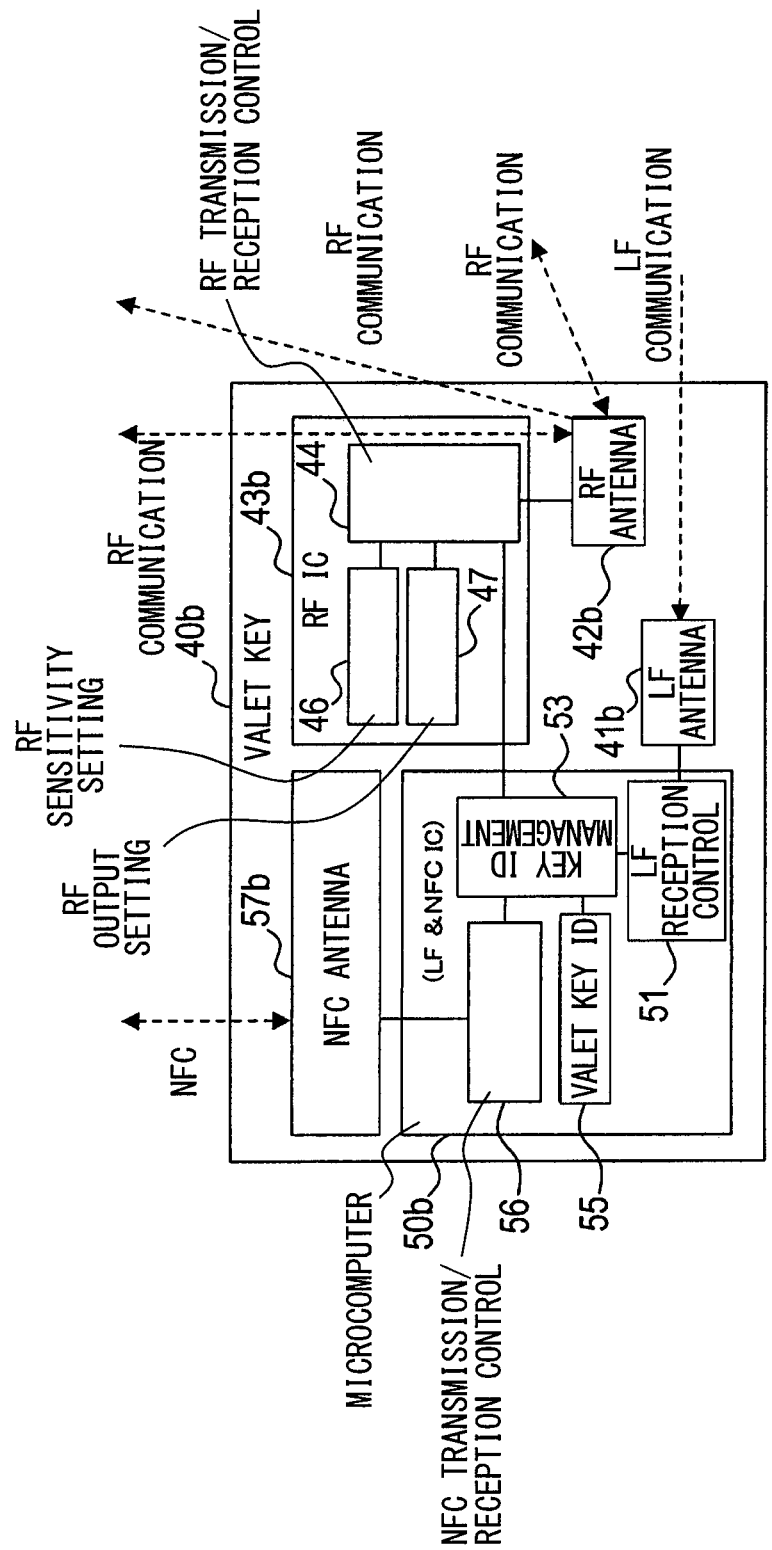
FIG. 1C is a block diagram illustrating a schematic configuration of a valet key.
Figure 1D:
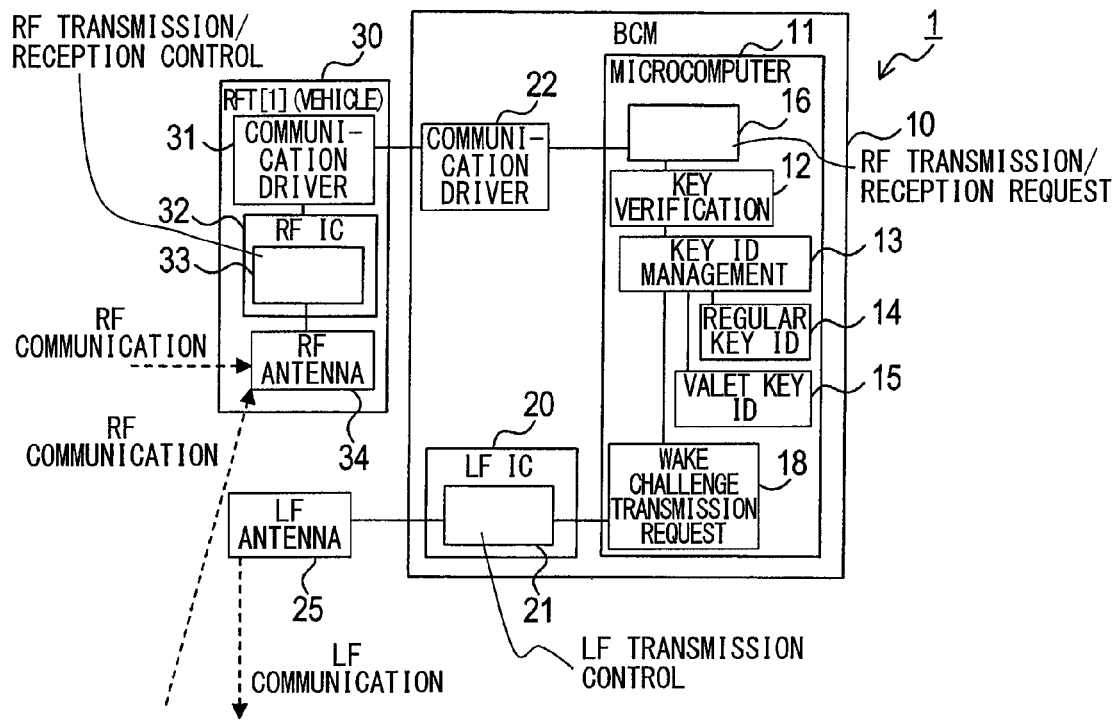
FIG. 1D is a block diagram illustrating schematic configurations of an RFT[1] and a BCM.
Figure 1E:
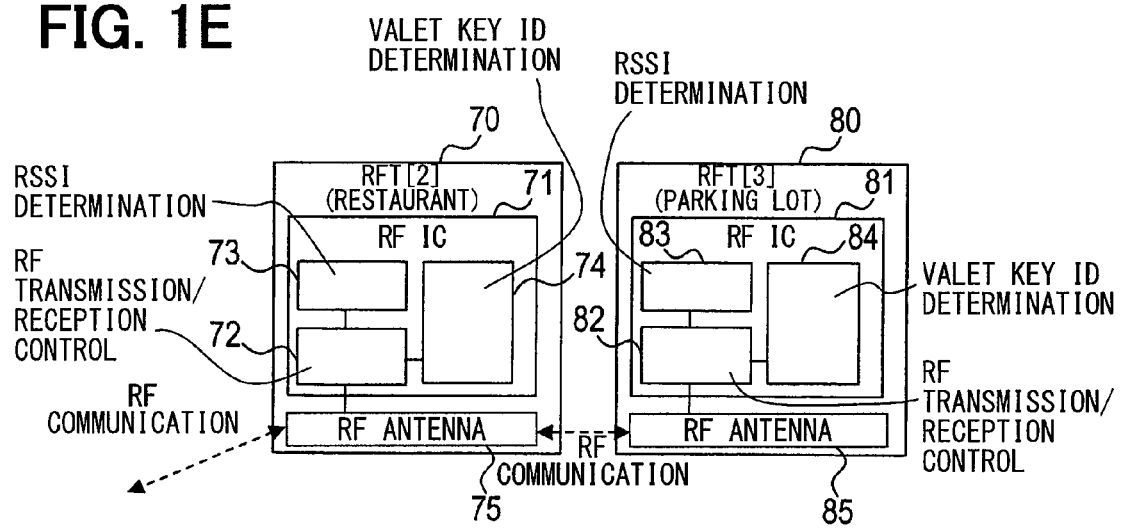
FIG. 1E is a block diagram illustrating schematic configurations of an RFT[2] and an RFT[3]

Hereinbelow, an embodiment according to the present disclosure will be described with reference to the drawings.

[Configuration of Embodiment]

A vehicle control system 1 to which the present disclosure is applied is a system that enables control of a vehicle by communication and authentication between a regular key 40a which is a portable device carried by a user and a body control module (BCM) 10 which is mounted on the vehicle. In particular, in the vehicle control system 1 of the present embodiment, authentication can also be performed using a valet key 40b which is capable of communicating with the regular key 40a and the BCM 10.

Specifically, as illustrated in FIGS. 1A to 1E, the vehicle control system 1 includes the BCM 10, the regular key 40a, the valet key 40b, and a plurality of radio frequency transceiver RFTs 30, 70, 80.

The BCM 10 is mounted on a vehicle such as a passenger car, and performs authentication with the regular key 40a and the valet key 40b and transmits an actuation enabling signal to, for example, a driving unit (an engine control unit, not illustrated) of the vehicle when the authentication is successful. That is, the regular key 40a and the valet key 40b function as wireless keys (portable devices) in the vehicle, and the BCM 10 functions as an authentication device thereof.

In the RFTs 30, 70, 80, the RFT[1] 30 is provided in the BCM 10. The RFT[2] 70 is arranged in any building such as a restaurant, and the RFT[3] 80 is arranged in a parking lot corresponding to the building.

The BCM 10 is configured as a computer (microcomputer 11) provided with a CPU and a memory (not illustrated). The BCM 10 executes functions as a key verification 12, a key ID management 13, an RF transmission/reception request 16, and a wake challenge transmission request 18. The BCM 10 records therein a regular key ID 14 and a valet key ID 15.

The function as the key verification 12 verifies the key ID included in the BCM 10 against a key ID obtained via LF communication or RF communication and determines whether these IDs match each other. Then, when these IDs match, unlocking of doors or drive of the vehicle is permitted.

The function as the key ID management 13 reads the regular key ID 14 or the valet key ID 15 in accordance with processing executed by the function of the key verification 12.

The function as the RF transmission/reception request 16 manages an operation as an interface that manages transmission and reception of data that should be communicated via radio frequency (RF) communication. Specifically, information transmitted from the regular key 40a or the valet key 40b is received.

The function as the wake challenge transmission request 18 generates an LF signal to be transmitted to the regular key 40a or the valet key 40b when a door switch (not illustrated) or a start switch (not illustrated) disposed on the lateral side of a door of the vehicle is operated.

The BCM 10 includes an LFIC 20 which is a circuit for performing LF communication and a communication driver 22 which communicates with the RFT 30. The LFIC 20 is disposed between an LF antenna 25 and the microcomputer 11, and has a function of transmitting data that is instructed to be transmitted via LF communication by the microcomputer 11 and transmitting data received through the LF antenna 25 to the microcomputer 11 (immobilizer transmission/reception control 21).

The RFT 30 includes a communication driver 31, an RFIC 32, and an RF antenna 34. The communication driver 31 communicates with a communication driver of another device such as the BCM 10. The RFIC 32 has a function as an RF transmission/reception control 33 which performs transmission and reception of data through the RF antenna 34 via RF communication.

The regular key 40a includes an LF antenna 41a, an RF antenna 42a, an RFIC 43a, a microcomputer 50a, and a near field communication (NFC) antenna 57a. The RFIC 43 has a function as an RF transmission/reception control 44 and a function as a valet key ID determination 45.

The function as the RF transmission/reception control 44 performs transmission and reception of data through the RF antenna 42a in accordance with an instruction from the microcomputer 50a.

The function as the valet key ID determination 45 determines whether a valet key ID received through the RF antenna 42a is an ID registered as the valet key ID 55 (described below) using a function of a key verification 52 (described below).

The microcomputer 50a includes a CPU (not illustrated) and a memory (not illustrated), and has functions as an LF reception control 51, the key verification 52, a key ID management 53, and an NFC transmission/reception control 56. The microcomputer 50a may be composed of hardware such as an IC.

The function as the LF reception control 51 performs control for extracting data from an LF signal received through the LF antenna 41a.

The function as the NFC transmission/reception control 56 performs transmission and reception of data through the NFC antenna 57a via NFC communication.

The functions as the key verification 52 and the key ID management 53 are equivalent to the functions of the key verification 12 and the key ID management 13 in the BCM 10.

The microcomputer 50a further includes recording areas (a regular key ID 54, a valet key ID 55) for recording the regular key ID and the valet key ID. The function of the key ID management 53 performs reading and writing of the regular key ID and the valet key ID with respect to the recording areas of the regular key ID 54 and the valet key ID 55.

The valet key 40b includes an LF antennal 41b, an RF antenna 42b, an RFIC 43b, a microcomputer 50b, and a near field communication (NFC) antenna 57b.

The microcomputer 50b has functions as an LF reception control 51, a key ID management 53, and an NFC transmission/reception control 56, and includes a recoding area (a valet key ID 55) for the valet key ID. The functions and the recording area have configurations similar to those in the microcomputer 50a of the regular key 40a.

The RFIC 43b has functions as an RF sensitivity setting 46 and an RF output setting 47 in addition to the function as the RF transmission/reception control 44 described above.

The functions as the RF sensitivity setting 46 and the RF output setting 47 set a reception sensitivity and an output corresponding to an RF communication distance that is set in accordance with an external instruction so as to enable communication with the set communication distance.

The RFT[2] 70 includes an RFIC 71 and an RF antenna 75. The RFIC 71 has functions as an RF transmission/reception control 72, a received signal strength indicator (RSSI) determination 73, and a valet key ID determination 74.

The function as the RF transmission/reception control 72 controls transmission/reception of data through the RF antenna 75.

The function as the RSSI determination 73 detects the strength of a signal received through the RF antenna 75 and sets an output and a sensitivity corresponding to the strength of the signal.

The function as the valet key ID determination 74 determines whether an ID of the valet key 40b received through the RF antenna 75 matches a previously set ID.

The RFT[3] 80 includes an RFIC 81 and an RF antenna 85. The RFIC 81 has functions as an RF transmission/reception control 82, an RSSI determination 83, and a valet key ID determination 84 which are similar to the RF transmission/reception control 72, the RSSI determination 73, and the valet key ID determination 74 of the RFT[2] 70.

[Processing of Embodiment]

Figure 2:
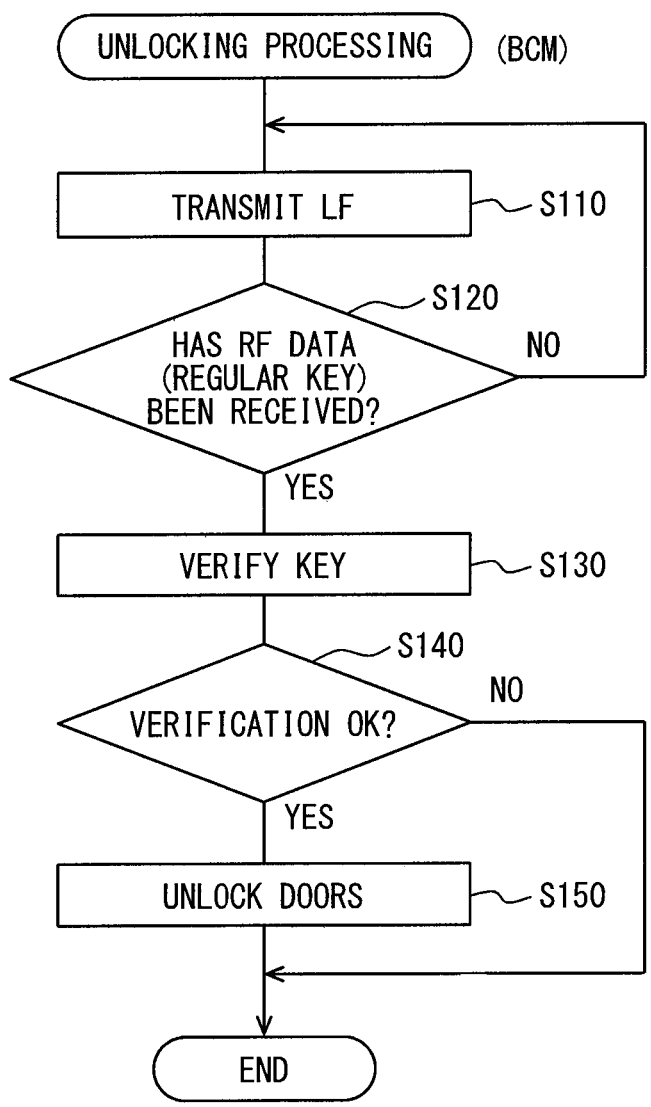
FIG. 2 is a flowchart illustrating unlocking processing executed by a microcomputer of the BCM.
Figure 3:
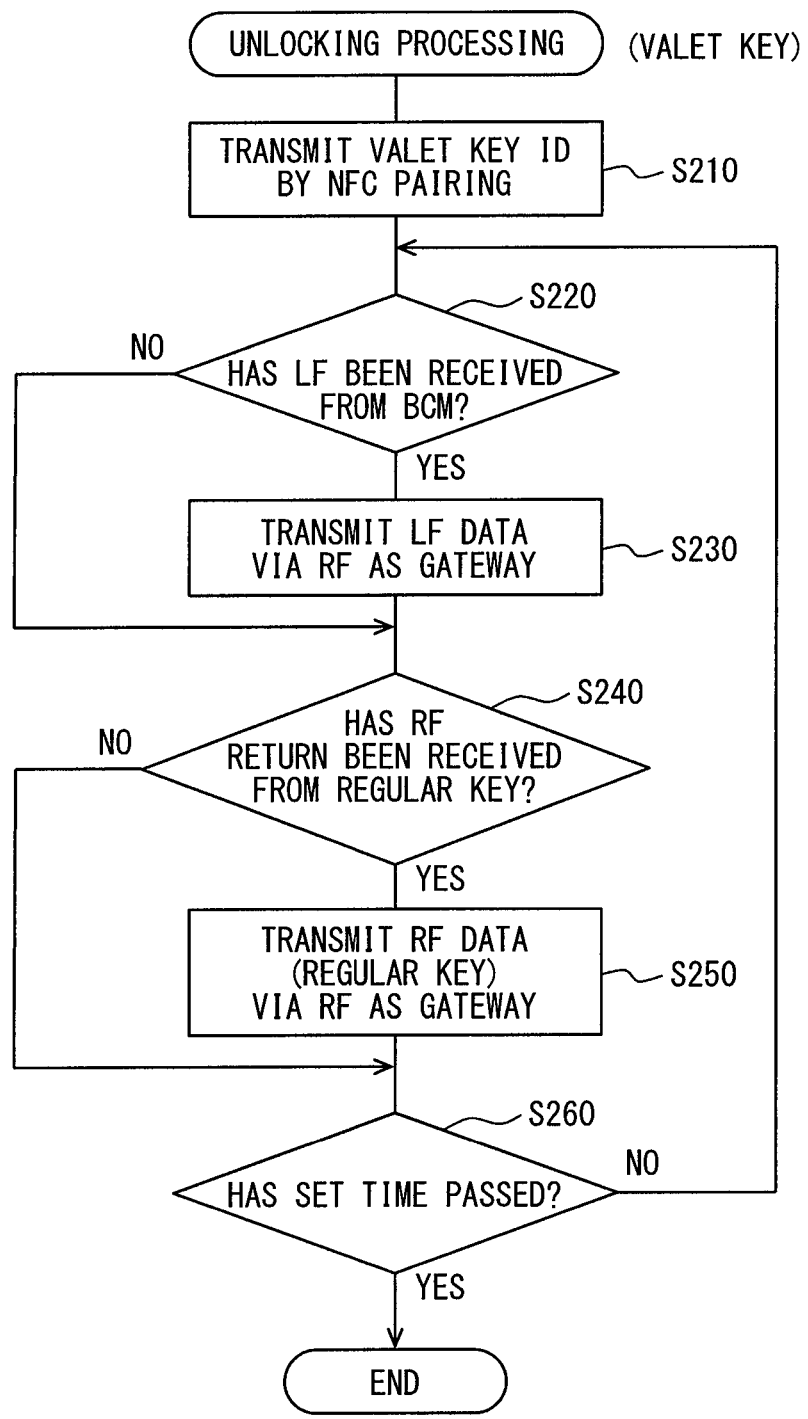
FIG. 3 is a flowchart illustrating unlocking processing executed by a microcomputer of the valet key.
Figure 4:
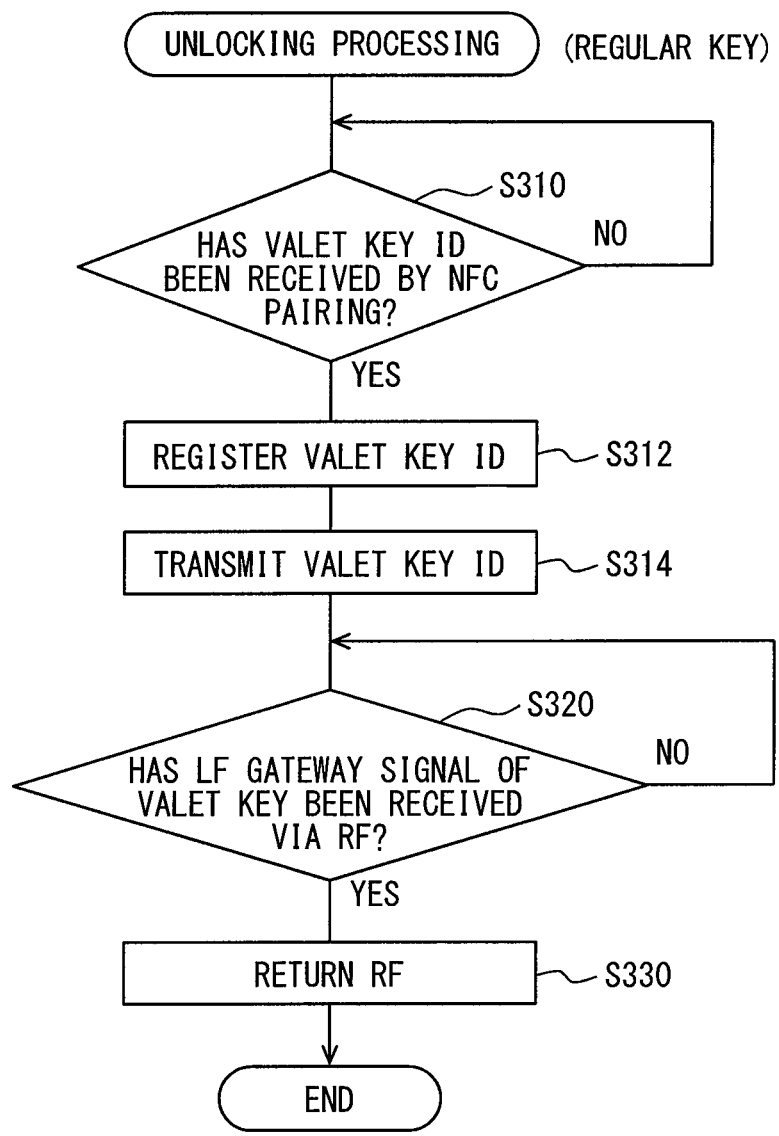
FIG. 4 is a flowchart illustrating unlocking processing executed by a microcomputer of the regular key.

In the vehicle control system 1 configured in this manner, unlocking processing illustrated in FIGS. 2 to 4 is performed. The unlocking processing is performed by communication between the BCM 10, the regular key 40a, and the valet key 40b when unlocking of the vehicle equipped with the BCM 10 is performed.

FIG. 2 illustrates unlocking processing by the BCM 10, and the processing is started, for example, when a door switch (unlocking switch) of the vehicle is operated.

In the unlocking processing by the BCM 10, as illustrated in FIG. 2, an LF request signal which requests the return of the ID is first transmitted to the regular key 40a or the valet key 40b located within the range of LF communication (S110). Then, it is determined whether RF communication data including the ID of the regular key 40a has been received from the regular key 40a or the valet key 40b (S120).

When the RF communication data has not been received (S120: NO), a return to the processing of S110 is made. When the RF communication data has been received (S120: YES), verification of the ID included in the RF communication data is performed (S130) to determine whether the ID included in the RF communication data matches the ID registered as the regular key ID 14 (S140).

Further, an available valet key ID is previously registered in the recoding area of the valet key ID 15 in a process described below and, when RF communication data is received from the valet key 40b, it is also determined whether the received ID matches the registered ID.

When the IDs match (S140: YES), an actuator (not illustrated) for unlocking doors is operated (S150), and the unlocking processing by the BCM 10 is finished. When the IDs do not match (S140: NO), the unlocking processing by the BCM 10 is finished.

Next, unlocking processing by the valet key 40b will be described with reference to FIG. 3. The unlocking processing by the valet key 40b is started, for example, when NFC communication with the regular key 40a is established.

Specifically, as illustrated in FIG. 3, paring by NFC is first performed, and the ID of the valet key 40b is transmitted to the regular key 40a (S210). Then, it is determined whether an LF request signal has been received from the BCM 10 (S220).

When the LF request signal has not been received (S220: NO), a shift to the process of S240 (described below) is made. When the LF request signal has been received (S220: YES), the received LF request signal is converted into an RF signal and transmitted as an LF gateway signal (S230). That is, the valet key 40b functions as a gateway which relays data.

Then, it is determined whether an RF return signal has been received from the regular key 40a (S240). When the RF return signal has not been received (S240: NO), a shift to the process of S260 (described below) is made.

When the RF return signal has been received (S240: YES), the RF return signal is transmitted as an RF signal (S250). Also in this process, the valet key 40b functions as a gateway. In the processes of S230 and S250, data is transferred with the ID of the valet key added.

In particular, when the valet key 40b functions as a gateway as described above, data to be relayed may be encoded. When the encoded data is relayed, the data is transmitted only with the ID of the valet key added without performing, for example, decoding on the data.

Then, it is determined whether a preset set time has passed (S260). The set time indicates a time during which the valet key 40b is made effective with respect to the regular key 40a. That is, the valet key 40b can be used only within the range of the set time after the NFC communication with the regular key 40a.

When the set time has not passed (S260: NO), a return to the process of S220 is made. When the set time has passed (S260: YES), the unlocking processing by the valet key 40b is finished.

Next, unlocking processing by the regular key 40a will be described with reference to FIG. 4. The processing is started, for example, when the power of the regular key 40a is turned on, and repeatedly performed thereafter.

In the unlocking processing by the regular key 40a, as illustrated in FIG. 4, it is first determined whether the ID of the valet key 40b has been received using NFC communication (S310). When the ID has not been received (S310: NO), the process of S310 is repeated.

When the ID has been received (S310: YES), the received ID of the valet key 40b is recorded in the area of the valet key ID 55 (S312), and the ID of the valet key 40b is transmitted to the BCM 10 (S314). The BCM 10 receives the ID of the valet key 40b and records the received ID in the area of the valet key 15 as an accessible key.

Then, it is determined whether an LF gateway signal has been received as an RF signal from the valet key 40b (S320).

When the LF gateway signal has not been received (S320: NO), the process of S320 is repeated. When the LF gateway signal has been received (S320: YES), an RF return signal is transmitted via RF communication (S330). The RF return signal includes data of an encoded ID of itself (the encoded ID of the regular key 40a).

When such processes are finished, the unlocking processing by the regular key 40a is finished.

The valet key 40b of the present embodiment has a distance setting function of setting a communicable distance with the regular key 40a. In this function, the valet key 40b communicates with the RFTs in facilities (the RFT[2] 70 in the restaurant and the RFT[3] in the parking lot) to enable setting of an optimal communicable distance according to the facilities.

Figure 5:
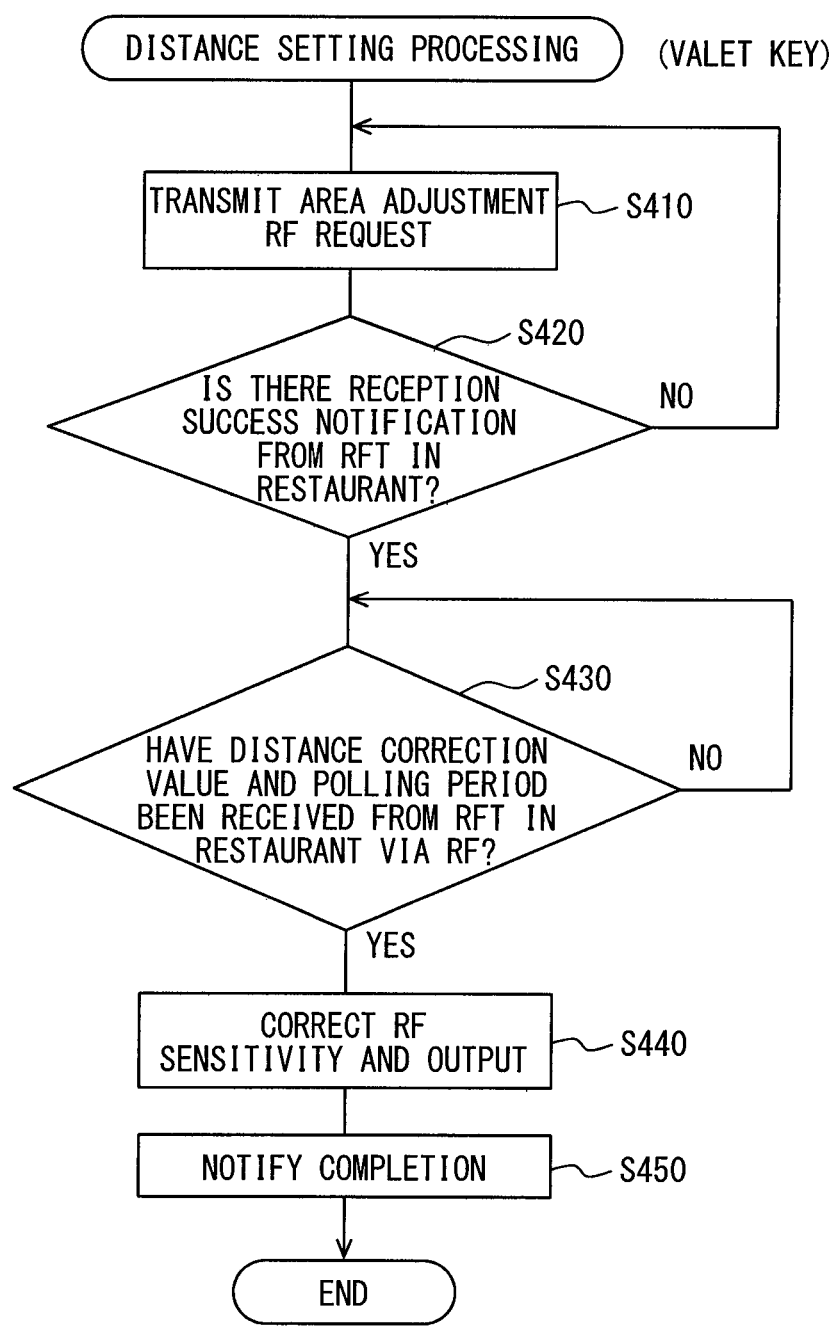
FIG. 5 is a flowchart illustrating distance setting processing executed by the microcomputer of the valet key.
Figure 6:
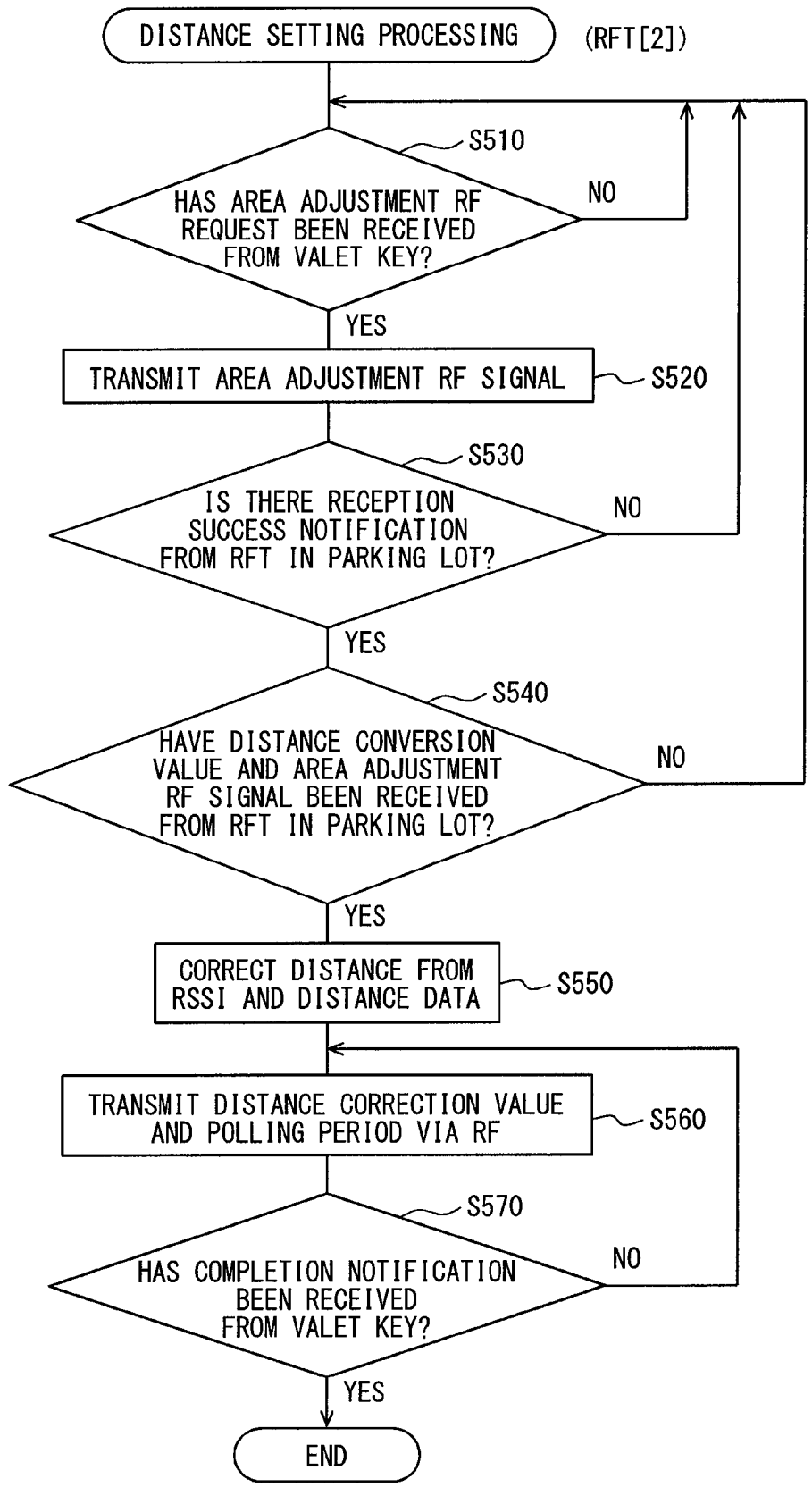
FIG. 6 is a flowchart illustrating distance setting processing executed by the RFT[2] in a restaurant.
Figure 7:
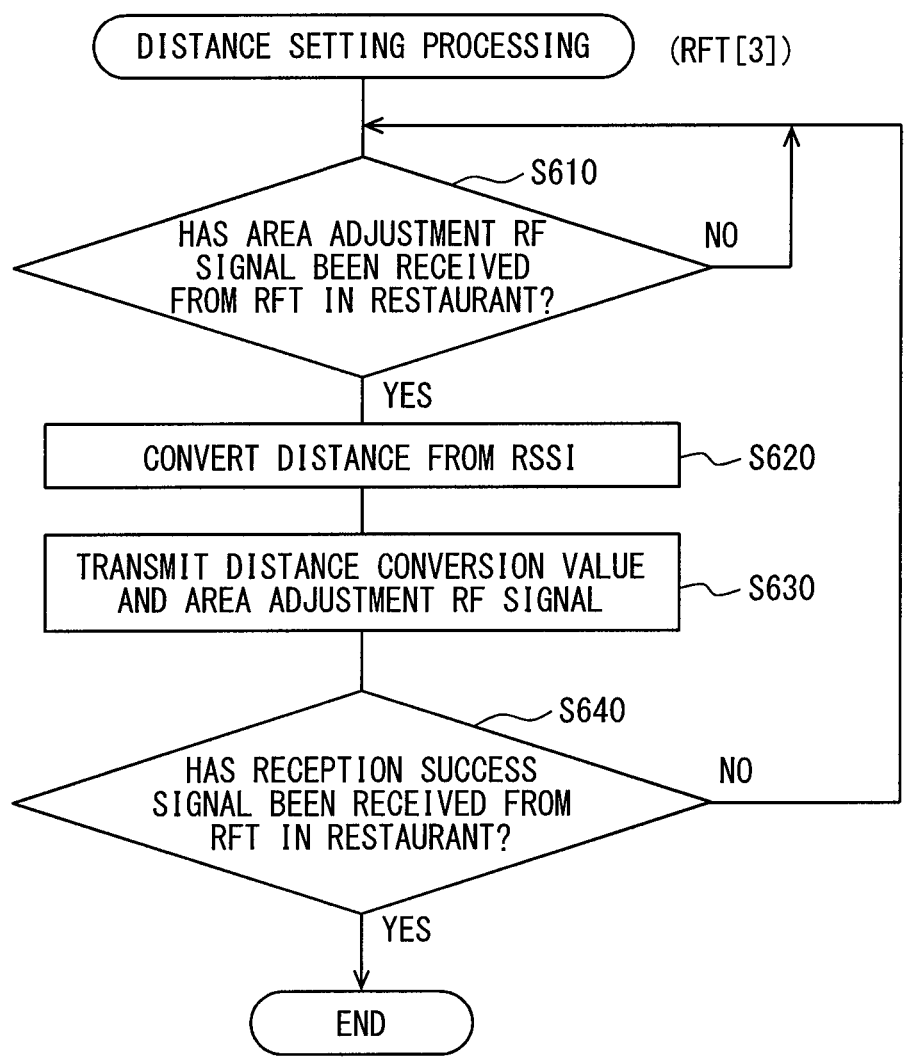
FIG. 7 is a flowchart illustrating distance setting processing executed by the RFT[3] in a parking lot.

The function is achieved by executing distance setting processing illustrated in FIGS. 5 to 7 by each device. First, distance setting processing by the valet key 40*b* will be described with reference to FIG. 5.

The processing is started at any timing, for example, when the NFC communication with the regular key 40*a* is completed. The distance setting processing is not an essential configuration, and a prescribed value (preset value) may be used as the communicable distance.

In the distance setting processing by the valet key 40*b*, as illustrated in FIG. 5, an area adjustment request is first transmitted via RF communication (S410). Then, it is determined whether a reception success notification has been received from the RFT[2] 70 in the restaurant (S420).

When the reception success notification has not been received (S420: NO), a return to the process of S410 is made. When the reception success notification has been received (S420: YES), it is determined whether various set values (a distance correction value and a polling period) have been received from the RFT[2] 70 in the restaurant via RF communication (S430). When the various set values have not been received (S430: NO), the process of S430 is repeated.

When the various set values have been received (S430: YES), the sensitivity of the RF communication and the output of the RF communication are corrected according to the set values (S440). Then, a completion notification is transmitted (S450), and the distance setting processing by the valet key 40*b* is finished.

Next, distance setting processing by the RFT[2] 70 in the restaurant will be described with reference to FIG. 6. The processing is started, for example, when the power of the RFT[2] 70 in the restaurant is turned on, and repeatedly performed thereafter.

In the distance setting processing by the RFT [2] 70, as illustrated in FIG. 6, it is first determined whether an area adjustment request has been received from the valet key 40*b* via RF communication (S510). When the area adjustment request has not been received (S510: NO), the process of S510 is repeated.

When the area adjustment request has been received (S510: YES), an area adjustment RF signal is transmitted (S520). The area adjustment RF signal is a signal for setting an optimal communicable distance according to the distance between the RFT[2] 70 in the restaurant and the RFT[3] 80 in the parking lot.

Then, it is determined whether a reception success notification has been received from the RFT[3] 80 in the parking lot (S530). When the reception success notification has not been received (S530: NO), a return to the process of S510 is made.

When the reception success notification has been received (S530: YES), it is determined whether a signal relating to a distance conversion value and area adjustment has been received from the RFT [3] 80 in the parking lot via RF communication (S540). When the signal has not been received (S540: NO), a return to the process of S510 is made.

When the signal has been received (S540: YES), distance correction is performed on the basis of the signal intensity (RSSI) and distance data (the signal relating to the distance conversion value and the area adjustment) (S550). That is, in order to make a range of the distance to the RFT[3] 80 in the parking lot fall within the communicable range, the distance is corrected in accordance with the acquired distance data. Then, the distance correction value and the polling period are transmitted via RF communication (S560).

Then, it is determined whether a completion notification has been received from the valet key 40*b* (S570). When the reception success notification has not been received (S570: NO), a return to the process of S560 is made. When the reception success notification has been received (S570: YES), the distance setting processing by the RFT[2] 70 is finished.

Next, distance setting processing by the RFT[3] 80 in the parking lot will be described with reference to FIG. 7. The processing is started, for example, when the power of the RFT[3] 80 in the parking lot is turned on, and repeatedly performed thereafter.

In the distance setting processing by the RFT[3] 80 in the parking lot, as illustrated in FIG. 7, it is first determined whether an area adjustment RF signal has been received from the RFT[2] 70 in the restaurant (S610). When the area adjustment RF signal has not been received (S610: NO), the process of S610 is repeated.

When the area adjustment RF signal has been received (S610: YES), distance conversion is performed on the basis of the signal intensity (RSSI). That is, the distance to the RFT[2] 70 in the restaurant is calculated on the basis of the signal intensity.

Then, a signal including a distance conversion value and an area adjustment signal is transmitted via RF communication (S630). Then, it is determined whether a reception success signal has been received from the RFT[2] 70 in the restaurant (S640). When the reception success signal has not been received (S640: NO), a return to the process of S610 is made.

When the reception success signal has been received (S640: YES), the distance setting processing by the RFT[3] 80 in the parking lot is finished.

An example of data exchanges in the unlocking processing and the distance setting processing will be described with reference to FIG. 8. When the regular key 40*a* and the valet key 40*b* are brought close to each other in the unlocking processing, the IDs are exchanged between the keys 40*a*, 40*b*, via NFC communication and the regular key 40*a* allows the BCM 10 to register the valet key 40*b* (refer to (A) of FIG. 8).

Figure 8:
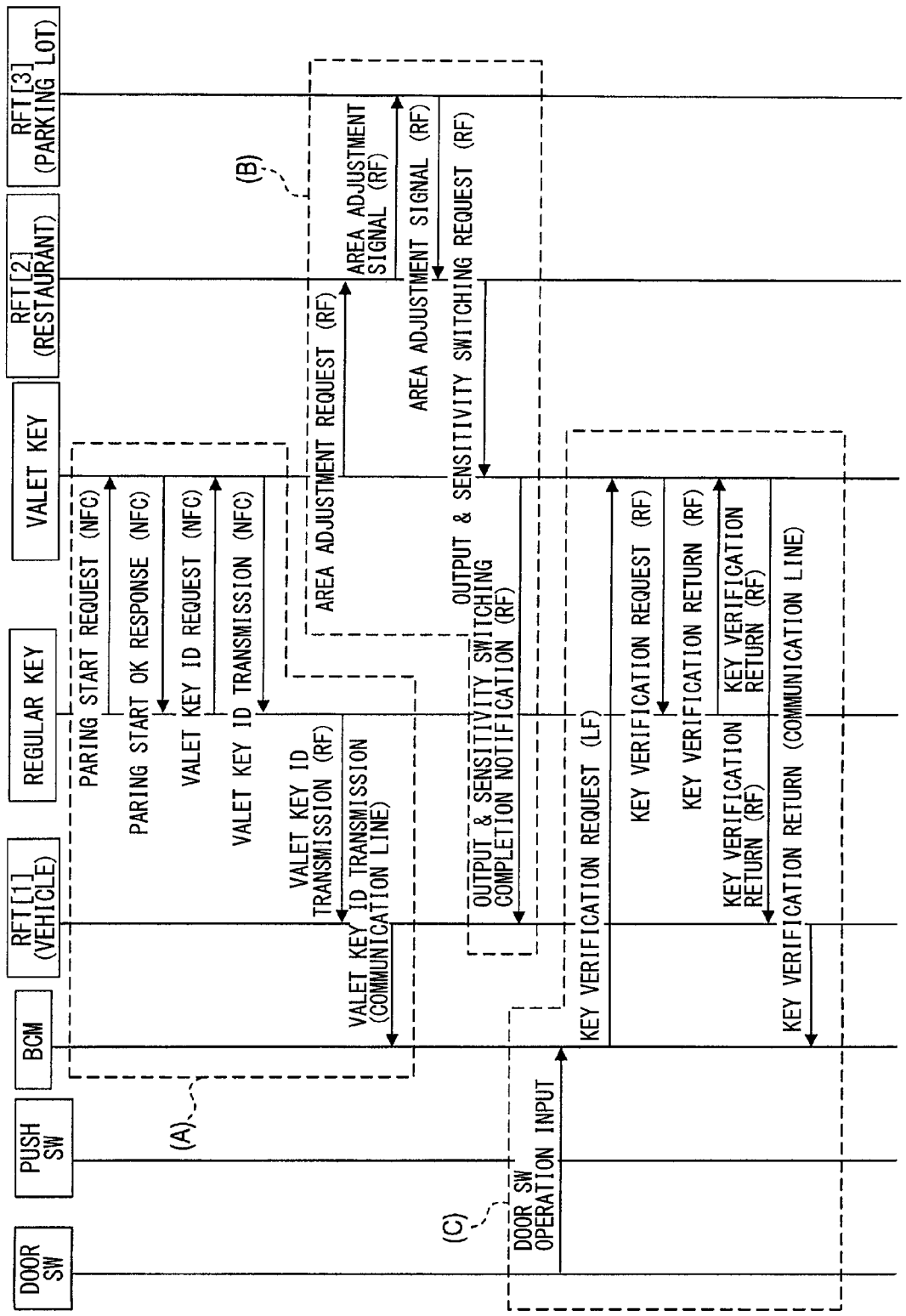
FIG. 8 is a ladder chart illustrating examples of the unlocking processing and the distance setting processing.

Then, the valet key 40*b* communicates with the RFT[2] in the restaurant to set an output and a sensitivity corresponding to the size of an area in which the use of the valet key 40*b* is permitted (refer to (B) of FIG. 8). The BCM 10 is also notified of the setting of the output and the sensitivity of the valet key 40*b*.

When unlocking of the doors is performed, the BCM 10 communicates with the valet key 40*b*. The valet key 40*b* also communicates with the regular key 40*a* and performs authentication with the BCM 10 using the ID of the regular key 40*a* (refer to (C) of FIG. 8).

Next, start processing which is performed when vehicle start (for example, engine start) is performed in the vehicle equipped with the BCM 10 will be described. The start processing is performed by cooperation between the BCM 10, the regular key 40*a*, and the valet key 40*b*. An example of the start of an engine will be described as an example of the start of the vehicle with reference to FIGS. 9 to 11.

First, start processing by the BCM 10 will be described with reference to FIG. 9. The processing is started when a start switch for starting the vehicle is operated by a user.

Figure 9:
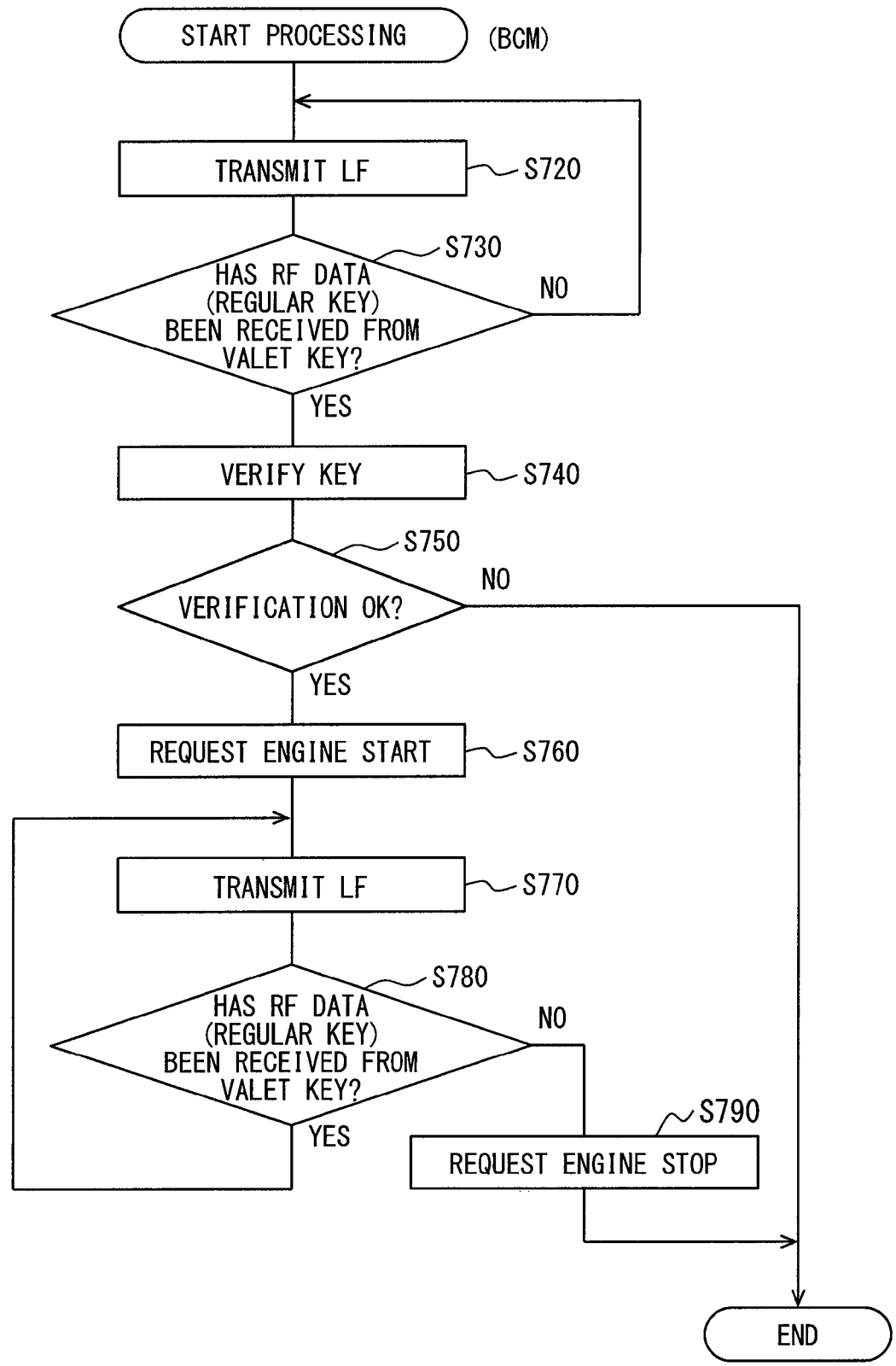
FIG. 9 is a flowchart illustrating start processing executed by the microcomputer of the BCM.

Specifically, as illustrated in FIG. 9, an LF request signal which requests the return of the ID is first transmitted to the regular key 40*a* or the valet key 40*b* located within the range of LF communication (S720). Then, it is determined whether RF communication data including the ID of the regular key 40*a* has been received from the regular key 40*a* or the valet key 40*b* (S730).

When the RF communication data has not been received (S730: NO), a return to the process of S720 is made. When the RF communication data has been received (S730: YES), verification of the ID included in the RF communication data is performed (S740) to determine whether the ID included in the RF communication data matches the regular key ID 14 or the ID registered as the valet key 15 (S750).

When the IDs do not match (S750: NO), the start processing by the BCM 10 is finished. When the IDs match (S750: YES), an actuator (not illustrated) for starting the engine is operated (S760).

Then, an LF request signal for requesting the return of the ID is transmitted to the regular key 40*a* or the valet key 40*b* located within the range of LF communication (S770). The processing is held in a stand-by state for a prescribed time (for example, approximately one minute) after the transmission of the preceding LF request signal.

Then, it is determined whether RF communication data including the ID of the regular key 40*a* has been received from the regular key 40*a* or the valet key 40*b* (S780). When the RF communication data has been received (S780: YES), a return to the process of S770 is made.

When the RF communication data has not been received (S780: NO), the stop of the engine is requested (S790), and the start processing by the BCM 10 is finished.

Next, start processing by the regular key 40*a* will be described with reference to FIG. 10. The processing is started, for example, when the power of the regular key 40*a* is turned on, and repeatedly performed thereafter.

Figure 10:
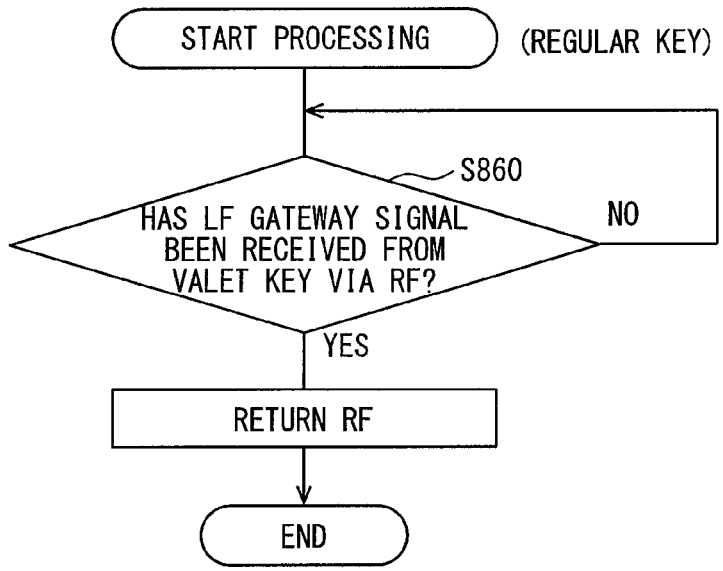
FIG. 10 is a flowchart illustrating start processing executed by the microcomputer of the regular key.

In the start processing by the regular key 40*a*, as illustrated in FIG. 10, it is first determined whether an LF gateway signal has been received as an RF signal from the valet key 40*b* (S860).

When the LF gateway signal has not been received (S860: NO), the process of S860 is repeated. When the LF gateway signal has been received (S860: YES), an RF return signal is transmitted via RF communication (S870).

When such processes are finished, the start processing by the regular key 40*a* is finished.

Next, start processing by the valet key 40*b* will be described with reference to FIG. 11. The start processing by the valet key 40*b* is started, for example, when NFC communication with the regular key 40*a* is established. Although, in the processing illustrated in FIG. 11, the process of S210 in FIG. 3 is omitted, the same process is preferably performed at the beginning (before the process of S910).

Figure 11:
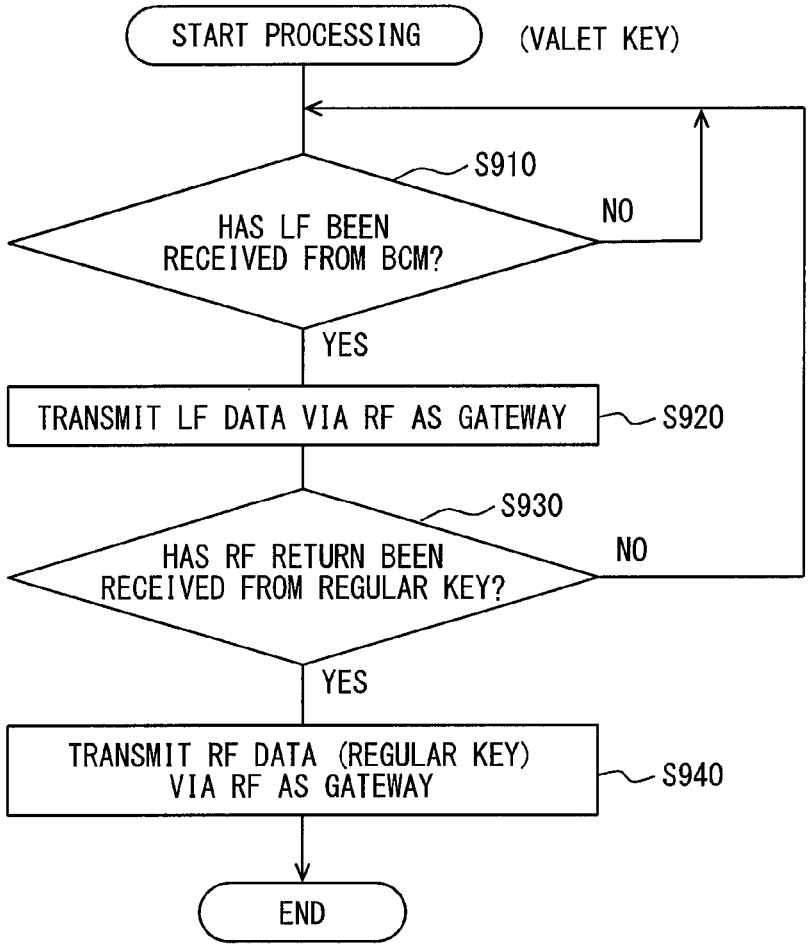
FIG. 11 is a flowchart illustrating start processing executed by the microcomputer of the valet key.

In the start processing by the valet key 40*b*, as illustrated in FIG. 11, it is first determined whether an LF request signal has been received from the BCM 10 (S910). When the LF request signal has not been received (S910: NO), a shift to the processing of S240 (described below) is made. When the LF request signal has been received (S910: YES), the received LF request signal is converted into an RF signal and transmitted as an LF gateway signal (S920).

Then, it is determined whether an RF return signal has been received from the regular key 40*a* (S930). When the RF return signal has not been received (S930: NO), a return to the process of S910 is made.

When the RF return signal has been received (S930: YES), the RF return signal is transmitted as an RF signal (S940). When these processes are finished, the start processing by the valet key 40*b* is finished. Also in this processing, a configuration that restricts a usage time after the NFC communication (the process of S260) may be employed similarly to the processing illustrated in FIG. 3.

Figure 12:
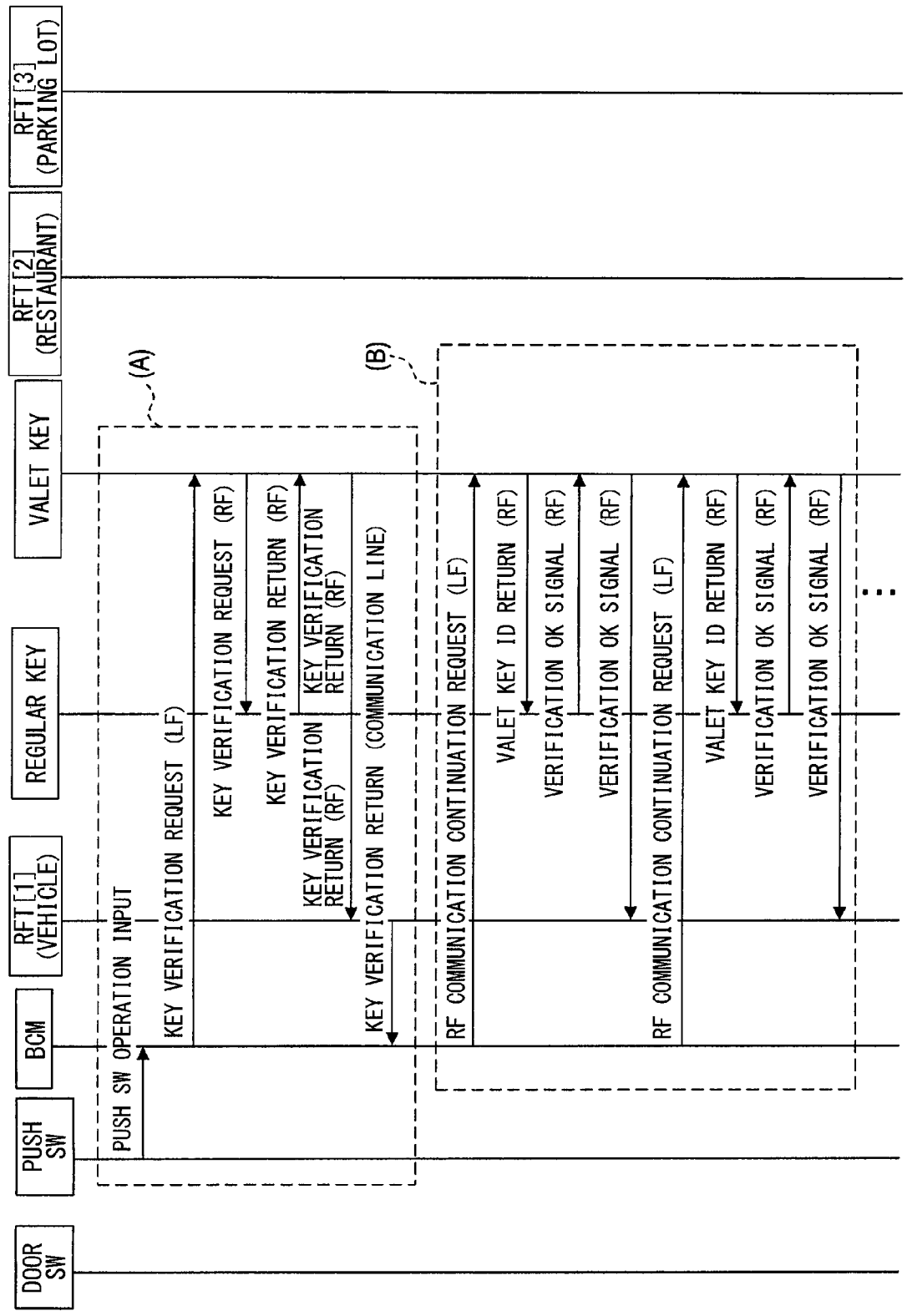
FIG. 12 is a ladder chart illustrating an example of the start processing.

An example of data exchanges in the start processing will be described with reference to FIG. 12.

When the start of the vehicle is performed, the BCM 10 communicates with the valet key 40*b*. The valet key 40*b* also communicates with the regular key 40*a* and performs authentication with the BCM 10 using the ID of the regular key 40*a* (refer to (A) of FIG. 12). After the start of the vehicle, the BCM 10 regularly performs an ID request (RF communication continuation request) to the valet key 40*b* and performs authentication of the ID (refer to (B) of FIG. 12). In this case, when the authentication of the ID fails (including when the ID is not returned), the vehicle is stopped.

[Effects of Embodiment]

The vehicle control system 1 specifically described above includes the BCM 10 which performs vehicle control previously set in the vehicle when authentication with an authentication device carried by a user is successful, the regular key 40*a* which functions as the authentication device, and the valet key 40*b* which is configured to be capable of communicating with both the BCM 10 and the regular key 40*a*.

In the valet key 40*b*, the microcomputer 50*b* performs wireless communication with the regular key 40*a* in authentication with the BCM 10 and performs the authentication with the BCM 10 when the wireless communication with the regular key 40*a* has been established.

The valet key 40*b* of the present disclosure having such a configuration can be used as a device for performing the authentication with the BCM 10 only within the communicable range with the regular key 40*a*. Thus, when a person other than an owner of the vehicle carries the valet key 40*b*, it is possible to restrict an area in which the vehicle can be controlled.

In the vehicle control system 1, the microcomputer 50*b* of the valet key 40*b* performs wireless communication with the regular key 40*a* to acquire authentication information required for the authentication with the BCM 10 from the regular key 40*a* and performs the authentication with the BCM 10 using the authentication information acquired from the regular key 40*a*.

According to the vehicle control system 1 having such a configuration, it is possible to allow the valet key 40*b* to function as a relay device (gateway) which relays the authentication information from the regular key 40*a* to the BCM 10. Thus, the valet key 40*b* requires no direct exchange of the authentication information with the BCM 10, and processing (preparation) when communication with the BCM 10 is started can thus be simplified. Even when the authentication information is encoded, the encoded authentication information can be relayed as it is. Thus, it is not necessary to perform decoding in the valet key 40*b*, and the configuration of the valet key 40*b* can be simplified while maintaining the security.

In the vehicle control system 1, the microcomputer 50*b* of the valet key 40*b* exchanges communication information for communicating with the regular key 40*a* using NFC communication which enables the communication by bringing the valet key 40*b* and the regular key 40*a* close to each other.

According to the vehicle control system 1 having such a configuration, since the communication information is exchanged via NFC communication which enables the communication by bringing the valet key 40*b* and the regular key 40*a* close to each other, leakage of the communication information can be reduced.

In the vehicle control system 1, the microcomputer 50*b* of the valet key 40*b* acquires a start signal indicating the start of authentication with the BCM 10 using LF communication, and performs wireless communication with the regular key 40*a* using RF communication different from the LF communication upon receiving the start signal.

According to the vehicle control system 1, since the communication method is changed, a communication distance suitable for the communication method can be easily ensured. Further, according to the vehicle control system 1, a communication method used in a current vehicle can be employed as it is.

In the vehicle control system 1, the microcomputer 50*b* of the valet key 40*b* transmits the start signal to the regular key 40*a*.

According to the vehicle control system 1 having such a configuration, the valet key 40*b* can function as a relay device which relays the start signal to the regular key 40*a*. Thus, it is possible to acquire information (authentication information) corresponding to the start signal from the regular key 40*a*.

In the vehicle control system 1, the microcomputer 11 of the BCM 10 monitors a communication state with the valet key 40*b* and inhibits the continuation of vehicle control when the communication with the valet key 40*b* is interrupted.

According to the vehicle control system 1 having such a configuration, since the communication state with the valet key 40*b* is monitored and the continuation of vehicle control is inhibited when the communication is interrupted, it is possible to set a range and a time in which the vehicle can be controlled in the authentication using the valet key 40*b*. Thus, the control of the vehicle can be restricted.

[Other Embodiments]

For example, although, in the above embodiment, the present disclosure is applied to the processing of unlocking doors and the processing of starting a vehicle, the present disclosure may be applied to any processing in vehicle control. Although, in the above embodiment, each processing is achieved by software performed by a microcomputer, the processing may be achieved by hardware such as a circuit capable of performing the equivalent processing.

[Correspondence Relationship Between Configuration of Embodiment and Present Disclosure]

The BCM 10 in the above embodiment corresponds to the vehicle control device in the present disclosure, and the regular key 40*a* in the above embodiment corresponds to the portable device in the present disclosure. The valet key 40*b* in the above embodiment corresponds to the communication apparatus in the present disclosure.

The NFC communication in the above embodiment corresponds to the first communication method in the present disclosure, the LF communication in the above embodiment corresponds to the second communication method in the present disclosure, and the RF communication in the above embodiment corresponds to the third communication method in the present disclosure. In the processes in the above embodiment, the processes of S230, S920 correspond to the to-portable-device communicator. The processes of S250, 940 in the above embodiment correspond to the authenticator in the present disclosure.

The process of S210 in the above embodiment corresponds to the communication information exchanger in the present disclosure, and the process of S220 in the above embodiment corresponds to the start signal acquirer in the present disclosure. The processes of S770, S780 in the above embodiment corresponds to the communication monitor in the present disclosure, and the process of S790 in the above embodiment corresponds to the control inhibitor in the present disclosure.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication apparatus for communicating with both of a vehicle control device, which performs vehicle control preliminary set in a vehicle when authentication with an authentication device carried by a user is successful, and a portable device, which functions as the authentication device, the communication apparatus also functioning as the authentication device, the communication apparatus comprising:
   a to-portable-device communicator that performs wireless communication with the portable device when performing authentication with the vehicle control device;
   an authenticator that performs authentication with the vehicle control device when wireless communication with the portable device is established; and
   a communication distance setting device that communicates with another communication apparatus in a facility, and sets a communicable distance according to the facility.

2. The communication apparatus according to claim 1, wherein:
   the to-portable-device communicator performs wireless communication with the portable device to acquire authentication information required for authentication with the vehicle control device from the portable device; and
   the authenticator performs authentication with the vehicle control device using the authentication information acquired from the portable device.

3. The communication apparatus according to claim 1, further comprising:
   a communication information exchanger that exchanges communication information for performing communication with the portable device using a first communication method that enables communication by bringing the portable device closer to the communication apparatus.

4. The communication apparatus according to claim 1, further comprising:
   a start signal acquirer that acquires a start signal indicating start of authentication with the vehicle control device using a second communication method, wherein:

the to-portable-device communicator performs wireless communication with the portable device using a third communication method different from the second communication method when receiving the start signal.

5. The communication apparatus according to claim 4, wherein:
the to-portable-device communicator transmits the start signal to the portable device.

6. The communication apparatus according to claim 4, wherein:
the communication apparatus uses low frequency communication as the second communication method, and uses radio frequency communication as the third communication method.

7. A vehicle control device that performs vehicle control preliminary set in a vehicle when authentication with an authentication device carried by a user is successful, and communicates with a communication apparatus as the authentication device, the vehicle control device comprising:
a communication monitor that monitors a communication state with the communication apparatus; and
a control inhibitor that inhibits continuation of the vehicle control when communication with the communication apparatus is interrupted, wherein:
the communication apparatus communicates with both of the vehicle control device, which performs the vehicle control preliminary set in the vehicle when the authentication with the authentication device carried by the user is successful, and a portable device, which functions as the authentication device;
the communication apparatus also functions as the authentication device;
the communication apparatus includes:
a to-portable-device communicator that performs wireless communication with the portable device when performing authentication with the vehicle control device; and
an authenticator that performs authentication with the vehicle control device when wireless communication with the portable device is established.

8. A vehicle control system comprising:
a vehicle control device that performs vehicle control preliminary set in a vehicle when authentication with an authentication device carried by a user is successful;
a portable device that functions as the authentication device; and
a communication apparatus that communicates with both the vehicle control device and the portable device, wherein:
the communication apparatus communicates with both of the vehicle control device, which performs vehicle control preliminary set in the vehicle when the authentication with the authentication device carried by the user is successful, and the portable device, which functions as the authentication device;
the communication apparatus also functions as the authentication device;
the communication apparatus includes:
a to-portable-device communicator that performs wireless communication with the portable device when performing the authentication with the vehicle control device;
an authenticator that performs authentication with the vehicle control device when wireless communication with the portable device is established; and
a communication distance setting device that communicates with another communication apparatus in a facility, and sets a communicable distance according to the facility;
the vehicle control device performs the vehicle control preliminary set in the vehicle when the authentication with the authentication device carried by the user is successful, and communicates with the communication apparatus as the authentication device; and
the vehicle control device includes:
a communication monitor that monitors a communication state with the communication apparatus; and
a control inhibitor that inhibits continuation of the vehicle control when communication with the communication apparatus is interrupted.

9. The communication apparatus of claim 1, wherein
the communication distance setting device sets the communicable distance according to whether a notification has been received from the other communication apparatus located in the facility.

10. The vehicle control device of claim 7, wherein
the vehicle control device further comprises a communication distance setting device that communicates with another communication apparatus in a facility, and sets a communicable distance according to the facility.

* * * * *